3,032,545
**PARTICLE AGGLOMERATION OF WATER PRE-
CIPITATED POLYOLEFINS**
Graham A. Renberg, Bartlesville, Okla., assignor to
Phillips Petroleum Company, a corporation of Delaware
Filed Nov. 20, 1959, Ser. No. 854,320
10 Claims. (Cl. 260—94.9)

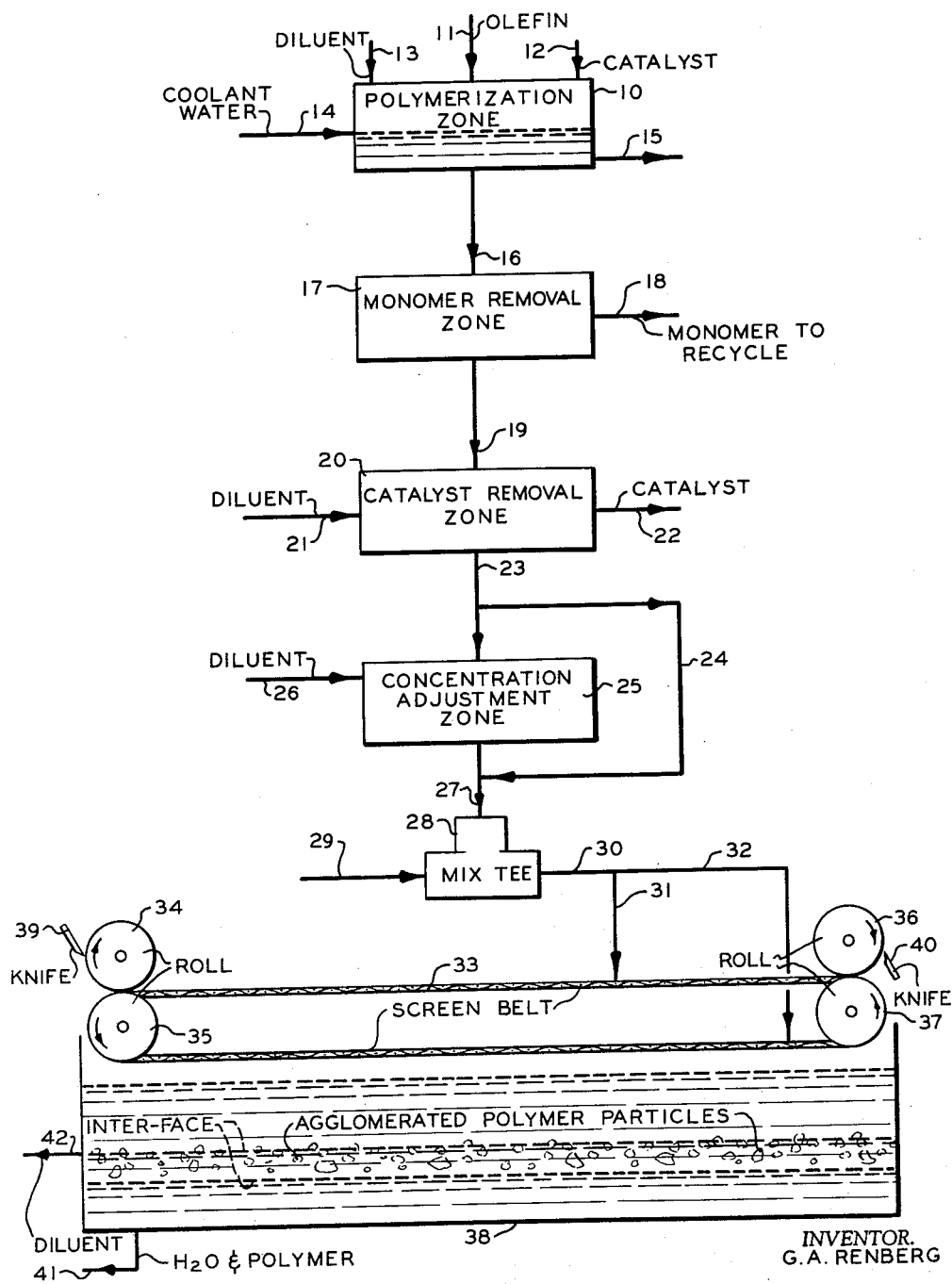

This invention relates to the agglomeration and separation of finely divided solids dispersed in a fluid medium. In accordance with one aspect, this invention relates to a method and/or apparatus for the agglomeration and separation of finely divided solids dispersed in a liquid. In accordance with another aspect, this invention relates to a method and/or apparatus for the agglomeration and separation of a finely divided solid polymer, such as polyethylene, from a fluid admixture comprising a hydrocarbon diluent and water.

It is known in the art to prepare thermoplastic materials by polymerizing unsaturated monomers to form high molecular weight, normally solid, thermoplastic polymers. Such polymers are useful for forming various objects of commerce, such as by extrusion, injection molding, vacuum forming, and the like. Such polymers are frequently formed in the presence of a hydrocarbon diluent or solvent. The polymer can then be separated from the hydrocarbon diluent by spraying or otherwise dispersing the polymer and diluent into water, thus forming a three-phase dispersion of water, liquid hydrocarbon and solid polymer. The polymer generally has a specific gravity or density intermediate that of the hydrocarbon diluent and water. It has been the practice in the art to pass this three-phase dispersion to a stripping zone where the diluent is stripped off by steam distillation, or the like, and the polymer-water slurry passed to a separation zone where polymer is removed by filtration or centrifuging and subsequently dried. By such an operation, a large amount of water and solvent must be heated to a temperature where the solvent can be removed. In accordance with the present invention, I have now found a convenient and economical method and an apparatus for concentrating a three-phase dispersion prior to steam stripping.

Accordingly, an object of this invention is to provide a novel method for the agglomeration and separation of dispersed finely divided solids from a fluid medium.

Another object of this invention is to provide novel apparatus adapted to separate finely divided solids dispersed in a fluid medium.

Another object of this invention is to provide a convenient and economical method and/or apparatus for the separation of a finely divided solid, such as a polyolefin, from admixture with two immiscible liquids.

Other aspects, objects, as well as the several advantages, are apparent from a study of the disclosure, drawing, and the appended claims.

In accordance with the present invention, a method for agglomerating and separating a dispersed solid, such as a finely divided polyolefin, especially polyethylene, is provided which comprises the steps of distributing a first portion of said dispersion onto one run of an endless traveling porous filtering zone to separate liquid and to retain said solid on said zone, passing said retained solid on said zone through a first compression zone, thereby removing substantially all of the remaining liquid and compacting said solid, introducing a second portion of said dispersion onto the other run of said zone containing said retained compacted solid and passing same through a second compression zone to remove said liquid and to flush said retained compacted solid from said zone, and collecting and recovering said compacted solid flushed from said zone as a product of the method.

Also, in accordance with the present invention, apparatus for agglomerating and separating a solid, such as a finely divided polyolefin, especially polyethylene, dispersed in a liquid medium is provided which comprises, in combination, an endless traveling filtering belt, means for feeding said dispersion onto the upper and lower runs of said belt, compression means at the end of each run of said belt for squeezing liquid out of said solid and compacting same, means for removing agglomerated solid from the surfaces of said compression means and said belt, and means for collecting and recovering agglomerated solids removed from said belt.

The mixture to be treated by the method or in the apparatus of this invention is any mixture comprising a liquid having a finely divided solid dispersed therein. However, the mixture most generally treated according to the present invention will be a mixture comprising two immiscible liquids and a solid having a density intermediate the density of the two liquids such as a thermoplastic polymer, water, and a hydrocarbon. Such a mixture will most frequently result from dispersing a polymer-hydrocarbon slurry or solution into water.

While the present invention is particularly valuable in recovering polymer from such a phase dispersion, the invention is broadly applicable for recovering solids generally from admixture with a fluid medium, especially two immiscible liquids. Examples of such solids include the natural and synthetic rubber crumb, for example, polymers of conjugated dienes or isobutylene. Copolymers of these with copolymerizable monomers, for example, butadiene/styrene copolymer, butadiene/ethylene copolymer, and the like; resins, such as polystyrene; vinyl resins such as polyvinylchloride and polyvinylacetate; cellulosic resins; polymers of acrylic and methacrylic acids and their derivatives; polyesters, polyamides; polyorganosiloxanes; polyfluorocarbons; epoxy resins; isoolefinic polymers; copolymers of isoolefins and diolefins; polymers of acetylenic compounds, for example, vinylacetylene, and the like.

The olefin polymers which can be treated in accordance with the present invention include solid polymers and copolymers of aliphatic mono-1-olefins, such a ethylene, propylene (especially isotactic polypropylene), 1-butene, etc. This invention is particularly applicable to polymers of 1-olefins having a maximum of 8 carbon atoms per molecule and no branching nearer the double bond than the 4-position, and more particularly, polyethylene. These 1-olefins can be polymerized alone, with each other, or with other monoolefins, such as butene-2, pentene-2, and the like, or with diolefins.

These polymers can be prepared by any method known to the art, for example, solution polymerization, gas phase polymerization, liquid phase polymerization, and the like. One method of preparing polymers of olefins is described and claimed in the application of Hogan and Banks, filed March 26, 1956, having Serial No. 573,877, now Patent No. 2,825,721. Generally, the polymer found in such two-liquid phase dispersion will be one prepared in the presence of a hydrocarbon diluent. However, polymer chlorinated in the presence of a chlorinated diluent can be suitably recovered from the diluent by dispersing the polymer-diluent mixture into water, for example, chlorinated polyethylene in carbon tetrachloride. In this case, chlorinated diluent would be the heavier liquid and water the lighter, and the chlorinated polymer would be heavier than the water and float on the diluent.

Polyethylene prepared by the Hogan et al. method will ordinarily have a molecular weight in the range 35,000 to 100,000, but can range as high as 200,000 or even higher. Such polymers will have a density in the range 0.950 to 0.980, for example, approximately 0.960, and a crystallinity of at least 70 percent, preferably in the range 90 to 95 percent at ambient temperature as determined by nuclear magnetic resonance. Polymers produced by this process have unsaturation which is preponderantly of a terminal vinyl and/or trans-internal structure. So-called "branched vinyl" unsaturation is substantially absent.

Density of the polymer as used herein is determined as follows:

Density is determined as follows: a 1/16" thick slab is compression molded by heating the polymer between suitable press platens, maintained at a temperature of 325° F. for 5 minutes, and then pressing the polymer at 20,000 p.s.i. Cooling water is then circulated through the platens so as to provide a cooling rate of from 20 to 50° F. per minute. A small "pea-size" specimen is cut from the prepared slab. The density is determined by the height at which the sample floats in an ethyl alcohol-water gradient column whose density at all levels is known. The density is reported as the value corrected to 23° C.

The crystallinity values are based upon measurements of nuclear magnetic resonance at approximately 75° F. The procedure which is followed to prepare the sample for test and to insure a close approach to equilibrium, is to (1) heat the polymer to a temperature about 50° C. above the crystalline melting point; (2) maintain the polymer at that temperature for approximately one hour, and (3) cool the polymer to room temperature at a rate characterized by a fall of 1.50° C. per minute at 135° C. This entire procedure is carried out in an environment essentially free of oxygen, e.g., nitrogen.

Solvents or diluent especially useful in polymerization of the 1-olefins are hydrocarbons and preferably paraffins including cycloparaffins. These diluents include paraffins and cycloparaffins having 3 to 12 carbon atoms per molecule. Any other paraffins or cycloparaffins which are a solvent for the polymer at the temperature in the polymerization range are suitable. Any hydrocarbon which is relatively inert, non-deleterious, and liquid under the operating conditions of the process can be utilized.

A better understanding of this invention will be obtained upon reference to the accompanying drawing which is a schematic flow diagram of one specific embodiment of the invention.

Referring now to the drawing, a feed stream consisting essentially of the polymerizable 1-olefin, ethylene, for example, is passed to polymerization zone 10 by way of conduit 11. Catalyst is introduced into said polymerization zone via conduit 12. The catalyst will usually be dispersed in at least a portion of the solvent. Any additional solvent is added to polymerization zone 10 by way of conduit 13. The ingredients in each of these conduits 11, 12 and 13 are preferably at polymerization temperatures (230 to 300° F.), however, one or more streams can be cooler with the remaining streams warmer. It should also be understood that the 1-olefin and solvent can be premixed, if desired. The polymerization reaction is exothermic so that it is necessary to remove heat from the polymerization zone. This can be accomplished by indirect heat exchange, for example, cooling water in conduit 14 and removed from polymerization zone 10 via conduit 15.

The polymerization zone effluent, at about 280° F., from zone 10 passes via conduit 16 to monomer removal zone 17 wherein unreacted ethylene is then vaporized and removed via conduit 18 to ethylene recycle. The mixture passes from monomer removal zone 17 via conduit 19 to catalyst removal zone 20 wherein the solution and catalyst are separated. The catalyst is removed by way of conduit 22 such as flushing with solvent from conduit 21. The polymer solution is passed from zone 20 to concentration adjustment zone 25 via conduit 23 where the concentration of polymer and diluent is adjusted for optimum precipitation properties by adding diluent as desired via conduit 26. Zone 25 is not always necessary and the effluent from zone 20 can be passed directly to mixing T 28 via conduit 24, if desired.

In general, the polyethylene concentration in conduit 23 is low and solvent is removed from zone 25 (not shown). However, if the concentration is high, solvent can be added via conduit 26. The solution is cooled in zone 25, either by evaporation or by cool solvent to about 240° F. The polyethylene concentration is adjusted in the range of about 2 to about 5 percent polymer. The polymer solution is dispersed in water of lower temperature so as to cause polymer to precipitate under such conditions that both the water and solvent remain as liquid phases. The solution passed from zone 25 to mixing T 28 wherein it is mixed with cool water. The mixture is maintained in conduit 30 until the polymer is precipitated.

The effluent from zone 25 passes via conduit 27 to mix T 28 where the polymer and diluent is dispersed in water supplied via conduit 29. If the polymer is in solution in the diluent, it will be precipitated when mixed with cool water in this T or zone. The temperature of the resulting three-phase dispersion of solid polymer, diluent and water, is such that the diluent and water remain substantially in the liquid phase. This portion of the description is fully disclosed and claimed in the copending application of Robert G. Wallace, filed February 3, 1958, having Serial No. 712,908, and is not a part of this invention.

While this discussion is directed to the preparation of a three-phase dispersion comprising water, diluent and solid polymer, it will be understood by those skilled in the art that the following description of my invention is applicable to any liquid containing finely divided solids dispersed therein that can be agglomerated by the present invention.

In accordance with the present invention, the three-phase dispersion in conduit 30 removed from mixing T 28 is divided into two streams in conduits 31 and 32. The portion of the dispersion flowing through conduit 31 is distributed onto the upper surface of the top run of an endless screen belt 33. The remainder of the dispersion is passed through conduit 32 and distributed onto the lower run of porous or screen belt 33. Feed means (not shown) are provided on the ends of conduits 31 and 32 for distributing the dispersion over the entire width of belt 33. Generally, about one-half of the dispersion in conduit 30 is distributed on each run of belt 33.

Porous or screen belt 33 is mounted on rolls 35 and 37. Pressure rolls 34 and 36 are disposed, preferably, in close proximity to rolls 35 and 37, and function to squeeze out liquid from the particles retained on the screen belt as well as assist in agglomerating the retained particles. Knives 39 and 40 are provided to remove solids retained on rolls 34 and 36, respectively. Also, means (not shown) can be provided on screen belt 33 to divert compacted solids into collection tank 38. Disposed below screen belt 33 is a tank 38 or other suitable container means for collecting liquid and agglomerated polymer particles. Preferably, container 38 is so sized as to provide adequate residence time so that phase separation of the diluent and water takes place. Draw-offs 41 and 42 are provided on the tank 38 for removing water and diluent, respectively. Draw-off 42 is preferably located near the interface between the water and diluent contained in tank 38.

In actual operation of this invention, the three-phase dispersion formed in conduit 30 is distributed on the upper surfaces of the upper and lower runs of screen belt 33. Solids distributed on the top run of belt 33 by conduit 31 are retained on top of the screen belt but a substantial portion of the liquid passes through the screen belt and is collected in tank 38. Liquid remaining in the retained particles distributed on the top run of belt 33 is squeezed out between the screen and roll 34, and the solids are compacted or agglomerated between rolls 34 and 35. Liquid squeezed out of the retained solids by roll 34 is collected in tank 38.

The solids squeezed into screen belt 33 by rolls 34 and 35 travel with the screen belt around roll 35 and a substantial portion of the compacted solids remain on the screen when it reaches roll 37. The mixing T effluent introduced onto the lower run of belt 33 by way of conduit 32 is distributed on the upper surface of the lower run of belt 33, preferably in close proximity to roll 37. A portion of the liquid distributed by conduit 32 passes through belt 33 and is collected in tank 38. However, the liquid squeezed out by roll 37 serves to flush screen belt 33 of solids retained from rolls 34 and 35 since filtering is from the opposite direction.

The specific nature of the belt is not critical except that the openings in the filtering belt should be so sized as to retain substantially all of the solid particles distributed on the two runs of the belt. The belt can be made of canvas or, if preferred, the belt can be of woven or other metal. The belt can be of any available materials which are recognized in the art as possessing satisfactory filtering properties.

The two immiscible liquids, that is, hydrocarbon diluent and water, collected in collection tank 38 will separate into two phases with the heavier liquid (water) being at the bottom of tank 38 and the lighter fluid (diluent) in the upper portion of the tank. The agglomerated polymer particles compacted on screen belt 33 and flushed into tank 38 will move readily to the solvent-water interface. The diluent or solvent phase can be removed from tank 38 by conduit 42. Polymer and water can then be removed from the bottom of tank 38 by way of conduit 41 and sent to further processing for the separation of the polymer which can then be dried and passed to an ultimate use.

It is obvious by the operation of the present invention that the volume of the material to be stripped is materially reduced with the attending savings in stripping costs. Also, it will be obvious to those skilled in the art that a very convenient and economical method and apparatus has been provided for the separation of difficultly separable solid dispersions.

To further illustrate this invention, a three-phase dispersion comprising diluent, water and polymer particles, is separated by the practice of the present invention. The diluent is cyclohexane and the polymer is polyethylene having a density of approximately 0.960 prepared by the process described and claimed in Hogan et al., supra. The density of the solvent is 0.74 and that of the water is 1.00.

A polymer solution containing about 4.5 weight percent polymer is introduced into a mixing T 28 and mixed with cool water. The three-phase dispersion containing fine particles of polyethylene suspended in the water and diluent admixture is introduced onto the upper and lower runs of endless traveling screen belt 33. Approximately one-half of the dispersion removed from mixing T 28 is distributed onto each run of the belt. The liquid in the dispersion is separated by gravity and by squeezing with the rolls on each end of endless belt 33 and collected in tank 38. Compacted or agglomerated polymer is removed from the belt and collected in tank 38.

The agglomerated polymer particles collected in the tank move quite readily to the diluent-water interface. The diluent is decanted from collection tank 38 and then the water and polymer are removed from the tank and easily separated into the individual components. The water and agglomerated polymer particles can be handled and dried quite easily.

It has been found that water precipitated polymer issuing from the mixing T has fine particles which remain suspended in the solvent phase upon settling when discharged into a collection tank, thus, the polymer particles cannot be separated from the liquid admixture. However, by utilizing the screen belt of the present invention, separation is readily accomplished.

Reasonable variation and modification are possible within the scope of the foregoing disclosure, the drawing, and the appended claims to the invention, the essence of which is that an improved method and/or apparatus is provided for the separation and agglomeration of finely divided polymer particles, such as polyethylene, which comprises distributing a dispersion of said polymer in a fluid admixture onto the upper and lower runs of an endless traveling porous filtering zone or belt to separate said liquid and to compact said particles by passing same through at least two compression zones, collecting separated liquid and compacted particles, and recovering said compacted particles as the product of the method.

I claim:

1. Method for agglomerating a finely divided solid dispersed in a fluid admixture which comprises introducing a first portion of said dispersion onto the upper surface of one section of an endless traveling porous filtering zone to separate a substantial portion of the liquid and to retain said solids on said zone, passing said retained solid on said zone to a first compression zone, thereby removing remaining fluid and compacting said solid, introducing a second portion of said dispersion onto the upper surface of a lower section of said zone containing said retained solid, passing same through a second compression zone to remove said fluid and to flush said retained compacted solid from said zone, and recovering said compacted solid flushed from said zone as a product of the method.

2. Method according to claim 1 wherein said solid is a finely divided polyolefin and said fluid is an admixture of two immiscible liquids.

3. Method according to claim 2 wherein said solid is polyethylene and said admixture is a hydrocarbon and water.

4. Method for agglomerating a finely divided solid dispersed in a liquid admixture which comprises distributing a first portion of said dispersion on the upper run of an endless horizontal traveling porous filtering zone to separate a substantial portion of said liquid and to retain said solid on said upper run, passing said retained solid on said zone through a first compression zone, thereby removing substantially all of the remaining liquid and compacting said solid, distributing a second portion of said dispersion on the lower run of said zone containing retained solids and passing same through a second compression zone, thereby removing said liquid and flushing said compacted solid from said zone, and collecting and recovering said flushed solid as a product of the method.

5. Method according to claim 4 wherein said solid is a finely divided polyolefin and said liquid admixture is two immiscible liquids.

6. Method according to claim 5 wherein said solid is polyethylene and said admixture is a hydrocarbon and water.

7. A method according to claim 4 wherein said first portion is distributed on the upper surface of the top run of said zone near said first compression zone and said second portion is distributed on the upper side of the lower run of said zone near said second compression zone.

8. Apparatus for agglomerating and collecting a finely divided solid dispersed in a liquid medium comprising, in combination, an endless traveling filtering belt, means for feeding said dispersion onto the upper and lower runs of said belt, compression means at the end of each run of said belt for squeezing liquid out of said solid and compacting same, means for removing agglomerated solid from the surfaces of said compression means and said belt, and means for collecting and recovering agglomerated solids removed from said belt.

9. Apparatus for agglomerating and collecting a finely divided solid dispersed in a liquid medium comprising, in combination, an endless traveling substantially horizontal screen belt, means for feeding a first portion of said dispersion onto the upper surface of the top run of said belt, counter-rotating roll means disposed at the end of each run of said belt for squeezing liquid from said solid and to compact same and flushing compacted solid from said belt, means for feeding a second portion of said dispersion onto the upper surface of the lower run of said belt, means for removing adhering solids from said roll means, and means for collecting and recovering agglomerated solid flushed from said belt.

10. Apparatus according to claim 9 wherein said means for feeding said first portion is in close proximity to the counter-rotating roll means disposed at one end of said belt and the means for feeding said second portion is disposed in close proximity to the counter-rotating roll means disposed at the other end of said endless belt.

References Cited in the file of this patent
UNITED STATES PATENTS

| | | |
|---|---|---|
| 272,324 | Renwick | Feb. 13, 1883 |
| 514,780 | Seiler et al. | Feb. 13, 1894 |
| 620,786 | Koerper et al. | Mar. 7, 1899 |
| 1,958,279 | Morgan | May 8, 1934 |
| 2,545,144 | Green et al. | Mar. 13, 1951 |
| 2,771,689 | Bettes | Nov. 27, 1956 |